United States Patent [19]

Cryer

[11] 4,321,437
[45] Mar. 23, 1982

[54] OPERATING LEVER ASSEMBLY FOR AN ELECTRICAL SWITCH

[75] Inventor: Edward Cryer, Burnley, England

[73] Assignee: Lucas Industries Ltd., Birmingham, England

[21] Appl. No.: 177,100

[22] Filed: Aug. 11, 1980

[30] Foreign Application Priority Data

Aug. 16, 1979 [GB] United Kingdom ............... 28501/79

[51] Int. Cl.³ ...................... H01H 3/12; H01H 21/00
[52] U.S. Cl. .............................. 200/61.54; 200/61.27; 200/4
[58] Field of Search ................ 200/4, 14, 17 R, 61.27, 200/61.3, 61.34, 61.35, 61.54

[56] References Cited

U.S. PATENT DOCUMENTS

| | | | |
|---|---|---|---|
| 3,499,125 | 3/1970 | Stoi | 200/4 |
| 3,859,489 | 1/1975 | Tomlinson | 200/61.27 X |

FOREIGN PATENT DOCUMENTS

| | | | |
|---|---|---|---|
| 2531696 | 2/1977 | Fed. Rep. of Germany | 200/61.54 |
| 1556288 | 2/1969 | France | 200/61.54 |
| 1031759 | 6/1966 | United Kingdom | 200/61.34 |

Primary Examiner—J. V. Truhe
Assistant Examiner—Richard M. Moose
Attorney, Agent, or Firm—Holman & Stern

[57] ABSTRACT

An operating lever assembly for a multifunction switch wherein the lever carries a rotary switch along its length and a push action switch at its end. The operating member of the push action switch is movable longitudinally relative to the lever to operate the push action switch and rotatable about the axis of the lever to operate the rotary switch.

6 Claims, 4 Drawing Figures

OPERATING LEVER ASSEMBLY FOR AN ELECTRICAL SWITCH

BRIEF SUMMARY OF THE INVENTION

This invention relates to an operating lever assembly or an electrical switch particularly but not exclusively a multi-function switch for mounting adjacent the steering column of a road vehicle.

Steering column mounted switches are well known in the road vehicle art and many known switches incorporate an elongate operating lever, the free, outer end of which carries a push action switch for example, for operating the vehicle horn. In many of the known switches the lever is movable bodily either about an axis parallel to the steering column axis or in a plane containing the steering column axis or both, to operate the multi-function switch. Other known switches include provision for rotating the lever about its longitudinal axis to operate other switching functions of the multi-function switch but such arrangements are less common. The need has arisen to incorporate a rotary switch function in a construction which normally affords only bodily movement of the lever, without substantial modification to the multi-function switch. In a previous proposal fulfilling this need the rotary switch function was provided by a rotary switch incorporated in the lever rather than in the multi-function switch in such a manner that it was necessary to provide the switch carried at the free end of the lever with a push button operating member separate from a rotatable operating member for the rotary switch. Thus the complexity of the assembly at the free end of the lever was much increased and a substantially completely new lever assembly using non-standard components was needed. It is an object of the present invention to provide an operating lever assembly for an electrical switch wherein rotary and push action switches incorporated in the lever assembly can be operated by a common operating member thereby permitting usage of many of the standard components used in a lever assembly without the rotary function.

In accordance with the present invention an operating lever assembly for an electrical switch includes a lever arranged at one end for connection in a switch mechanism whereby bodily movement of the lever relative to the switch mechanism operates said mechanism, a rotary switch carried by said lever intermediate the ends of the lever, the rotary switch including a base secured to the lever, a rotor rotatable relative to said base and said lever, and switch contacts operable by angular movement of the rotor relative to said base about the longitudinal axis of said lever, a drive sleeve within which said lever extends, said drive sleeve being rotatable relative to the lever about the longitudinal axis of the lever and being coupled at one end to said rotor, a hollow operating member coupled to the end of said drive sleeve remote from said rotor, said operating member being non-rotatable relative to the drive sleeve, but being capable of movement relative to the drive sleeve longitudinally of the drive sleeve, and, a push action switch mechanism housed within said operating member, said push action switch mechanism including a body fixed against movement longitudinally of the drive sleeve and lever, and the mechanism being operable by movement of the operating member relative to the body longitudinally of the drive sleeve and the lever, whereby rotational movement of the operating member relative to the lever about the longitudinal axis of the lever causes, through the intermediary of said drive sleeve, angular movement of the rotor of said rotary switch relative to the base of the rotary switch to operate the contacts of the rotary switch, whereas longitudinal movement of the operating member relative to the lever causes operation of the push action switch, the operating member moving longitudinally relative to the drive sleeve and the lever.

Preferably the push action switch is mono-stable, and there is provided an operating member return spring urging the operating member to a rest position relative to the body of the push-action switch.

Desirably the body of the push-action switch carries a pair of electrical contacts which are bridged by a bridging contact carried by the operating member when the operating member is moved longitudinally relative to the drive sleeve and the lever against the action of said resilient means.

Preferably the body of the push-action switch is secured to the end of the drive sleeve remote from said rotor, and the operating member engages said body in such a manner that the operating member is capable of longitudinal movement, but not rotational movement relative to said body, said body thus providing the coupling between the operating member and the drive sleeve whereby the drive sleeve rotates with the operating member.

Conveniently said lever is hollow and conductive, and one electrical connection to said push-action switch is made by way of an insulated electrical lead which extends within said lever, a second electrical connection to the push-action switch being made by way of the drive sleeve which is conductive, and the lever.

Desirably the body of the push-action switch is secured to an adapter sleeve which in turn is secured to the drive sleeve.

BRIEF DESCRIPTION OF THE DRAWINGS

One example of the invention is illustrated in the accompanying drawings wherein.

DETAILED DESCRIPTION

Figure 1:
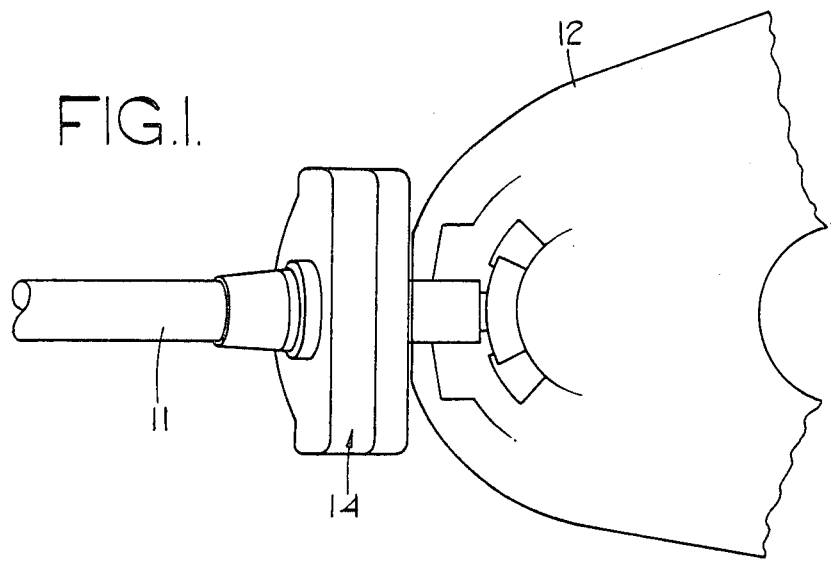
FIG. 1 is a fragmentary plan view of part of an operating lever assembly, and part of a multi-function switch operable by the lever assembly.

Referring to the drawings, the lever assembly 11 extends in use from a body 12 of a multi-function switch. The body 12 is arranged to be secured adjacent the steering column of a road vehicle, with the lever assembly 11 extending generally radially outwardly from the steering column to facilitate operation of the multi-function switch. Although the multi-function switch can take a number of forms it will be understood that in general terms the multi-function switch can be operated by bodily movement of the lever assembly 11 relative to the fixed part of the switch mechanism 12. For example, the lever assembly 11 may be moved relative to the body 12 about an axis parallel to the steering column axis, and may also be movable in a plane at right-angles, that is to say in a plane containing the axis of the steering column. These movements of the lever assembly 11 operate respective sets of switch contacts within the body 12.

The lever assembly includes a hollow metal lever 13 which at one end is coupled to the switch mechanisms within the body 12. Adjacent the body 12, but external to the body 12 the lever 13 carries a rotary switch 14. The rotary switch 14 comprises a moulded synthetic resin base 15 which is rigidly secured to the lever 13, and a moulded synthetic resin cover 16 which in use is rigidly secured to the base 15 and defines therewith a housing. Within the housing defined by the cover 16 and base 15 is rotatably mounted a moulded synthetic resin rotor 17, the lever 13 extending through the rotor 17 and the rotor 17 being rotatable relative to the base 15 and the lever 13 about the longitudinal axis of the lever. The rotor 17 carries a moving contact plate 18 which is resiliently urged towards the base 15, and which co-operates with three fixed contacts 19, 21, 22 carried by the base. Each of the fixed contacts 19, 21, 22 includes an integral terminal member extending from the base to facilitate the making of external electrical connections to the contacts 19, 21, 22.

A metallic drive sleeve 23 is mounted on the lever 13 and is rotatable relative thereto. The sleeve 23 is a relatively close, but freely movable fit on the lever 13 and is connected at one end to the rotor 17 so that the rotor 17 can be rotated relative to the base 15 by rotation of the drive sleeve 23 on the lever 13. The drive sleeve 23 extends beyond the end of the lever 13 remote from the multi-function switch body 12, and has rigidly secured thereto an adapter sleeve 24. The adapter sleeve 24 is provided purely for convenience, and it is to be recognised that if desired the adapter sleeve 24 could be an integral part of the drive sleeve 23. The adapter sleeve 24 carries a moulded synthetic resin block 25 of non-circular cross-section, and the face of the block 25 remote from the sleeve 24 carries a pair of resilient contact blades 26, 27 which are insulated from one another by the block 25.

A moulded synthetic resin operating member 28 defined by a hollow sleeve 29 and a cap 31 is supported on the drive sleeve 23. The sleeve 29 of the operating member 28 houses the adapter sleeve 24 and the block 25 and is closed at its end remote from the drive sleeve 23 by the cap 31 which is a snap fit therewith. The cap 31 includes an internal, integral extension 32 upon which is mounted an annular, frusto-conical conductive member 33.

The end of the sleeve 29 remote from the cap 31 is a relatively close fit on the adapter sleeve 24, but can move relative to the sleeve 24 and sleeve 23 in the direction of the length of the sleeve 23. The operating member 28 cannot however rotate relative to the sleeve 23 since the block 25, of non-circular cross-section, is received within a region of complimentary shape in the sleeve 29. Thus the block 25 and adapter sleeve 24 serve to couple the operating member 28 and the drive sleeve 23 for rotational movement while at the same time permitting longitudinal movement of the operating member 28 relative to the drive sleeve 23.

Between the end of the adapter sleeve 24 and the rotor 17 the outer surface of the drive sleeve 23 is protected by an electrically insulating covering 34.

The contacts 26, 27 and the bridging member 33 within the operating member 28 constitute a push-action switch. In this instance the push-action switch is mono-stable, there being a helical compression spring 35 acting between an abutment surface on the interior of the cap 31 and the block 25. The spring 35 urges the operating member 28 longitudinally of the lever 13 to a position wherein the contacts 26, 27 engage an electrically insulating part of the cap 31. Movement of the operating member 28 longitudinally relative to the lever 13, in a direction towards the rotary switch 14 causes compression of the spring 35, and moves the metal annulus 33 between the contacts 26, 27 to bridging the contacts 26, 27. An electrical connection is made to the contact 26 by way of a conductive lead 36 which extends within the adapter sleeve 24 and the hollow lever 13, and which is insulated therefrom by the normal insulating sheath of the lead. An electrical connection to the contact 27 is made by way of the sleeve 24, the sleeve 23 and the lever 13 itself. All of these parts therefore are electrically conductive, and the fit of the sleeve 23 on the lever 13 is sufficiently close for a good electrical connection to be made, while at the same time permitting rotation of the sleeve 23 relative to the lever 13.

It will be recognised that in order to operate the rotary switch a twisting movement is applied to the operating member 28 to rotate the operating member 28 about the axis of the lever 13. Such movement of the operating member 28 is transmitted via the block 25, the adapter sleeve 24, the drive sleeve 23, and the rotor 17 to the moving contact plate 18 of the rotary switch. Thus the moving contact plate 18 is moved relative to the fixed contacts 19, 21, 22 to bridge different sets of the contacts 19, 21, 22 dependent upon the rotary position of the plate 18 relative to the base 15. The rotor 17 is formed within the housing defined by the base 15 and cover 16 with three flat surfaces arranged at 90° to one another around the axis of rotation of the rotor. A leaf spring 37 within the housing presses against the rotor, and can engage any one of the three flat surfaces, dependent upon the rotated position of the rotor, the spring 37 and the flat surfaces of the rotor thus constituting a detent mechanism defining three angularly spaced stable positions of the rotor relative to the base 15.

Figure 2:
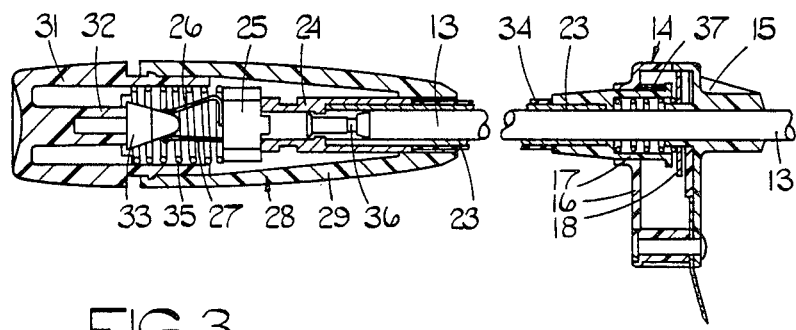
FIG. 2 is a side elevational view, partly in section of the lever assembly.
Figure 3:
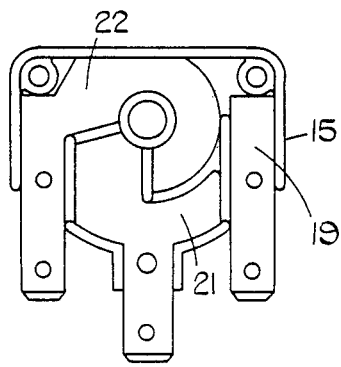
FIG. 3 is a plan view of the base of the rotary switch of the lever assembly shown in FIG. 2.
Figure 4:
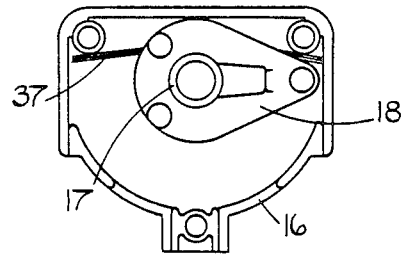
FIG. 4 is a left side view of the rotary switch shown in FIG. 2 with parts removed to show the inside of the cover.

It will be recognised that the provision of the rotary switch 14 on the lever 13 in no way impedes the operation of the multi-function switch 12. Moreover, many of the components utilized in the assembly are common to a lever assembly which does not incorporate the switch 14. Thus in a known lever assembly not incorporating the switch 14 the switch 14, the drive sleeve 23 and the adapter sleeve 24 are omitted, and the block 25 is secured to the end of the lever 13 either directly, or through a fixed coupling sleeve. The push-action switch within the operating member 28 is in exactly the form shown in FIG. 2, but of course since the block 25 is carried by the lever 13 no rotation of the operating member is possible. Thus it will be recognised that by comparison with this prior arrangement the assembly including the switch 14 can be constructed in a very simple and convenient manner using a multitude of the standard components utilized in the prior construction.

It will be recognised that the block 25 and the operating member 28 include corresponding abutment surfaces which limit movement of the operating member 28 relative to the lever 13 under the action of the spring 35.

The action of spring 37 on the rotor 17 has the effect of urging the drive sleeve 23 laterally into contact with the lever 13, thereby ensuring good electrical contact.

I claim:

1. An operating lever assembly for a switch mechanism comprising a lever arranged at one end for connection in the switch mechanism whereby bodily movement of the lever relative to the switch mechanism operates the mechanism, a rotary switch carried by said lever and positioned intermediate the ends of the lever, the rotary switch comprising a base secured to the lever, a rotor rotatable relative to said base and said lever, a fixed switch contact, and a movable switch contact, said switch contacts being operable by angular movement of the rotor relative to the base about the longitudinal axis of the lever, a drive sleeve within which said lever extends, said drive sleeve being rotatable relative to the lever about the longitudinal axis of the lever and being connected at one end to said rotor of said rotary switch, a hollow operating member coupled to the end of said drive sleeve remote from said rotor of said rotary switch, said operating member being coupled to said drive sleeve in a non-rotatable manner, but being capable of movement relative to the drive sleeve longitudinally of the drive sleeve, and, a push action switch mechanism housed within said operating member, said push action switch mechanism including a body fixed against movement in the longitudinal direction of the drive sleeve, a fixed switch contact, and a movable switch contact, said push action switch mechanism contacts being operable by movement of said operating member relative to said body and said drive sleeve in the longitudinal direction of the drive sleeve, whereby, rotational movement of said operating member relative to said lever about the longitudinal axis of said lever rotates said drive sleeve and thus said rotor of said rotary switch relative to said lever and to the base of said rotary switch to operate said rotary switch contacts, whereas longitudinal movement of said operating member relative to said drive sleeve and said lever causes said operation of said push action switch contacts.

2. An assembly as claimed in claim 1, wherein the push action switch is mono-stable, and there is provided an operating member return spring urging the operating member to a rest position relative to the body of the push action switch.

3. An assembly as claimed in claim 1, wherein said fixed switch of the push action switch comprises a pair of electrical contacts mounted on said body which are bridged by an electrically conducting bridging contact carried by the operating member when the operating member is moved longitudinally. relative to the drive sleeve and the lever against the action of said resilient means.

4. An assembly as claimed in claim 1, wherein said lever is hollow and electrically conductive, said drive sleeve is electrically conductive, and an external electrical connection to one of said push action switch contacts is made by way of an insulated electrical lead which extends within said lever, and a second external electrical connection to the other of said push action switch contacts is made by way of said drive sleeve and said lever.

5. An assembly as claimed in claim 1, wherein an adapter sleeve is provided which is secured to the drive sleeve, and said body of the push action switch is secured to said adapter sleeve.

6. An assembly as claimed in any one of claims 1 or 2, wherein the body of the push action switch is secured to the end of the drive sleeve remote from said rotor, and the operating member engages said body in such a manner that the operating member is capable of longitudinal movement but not rotational movement relative to said body, said body thus providing the coupling between the operating member and the drive sleeve whereby the drive sleeve rotates with the operating member.

* * * * *